Figure 1:
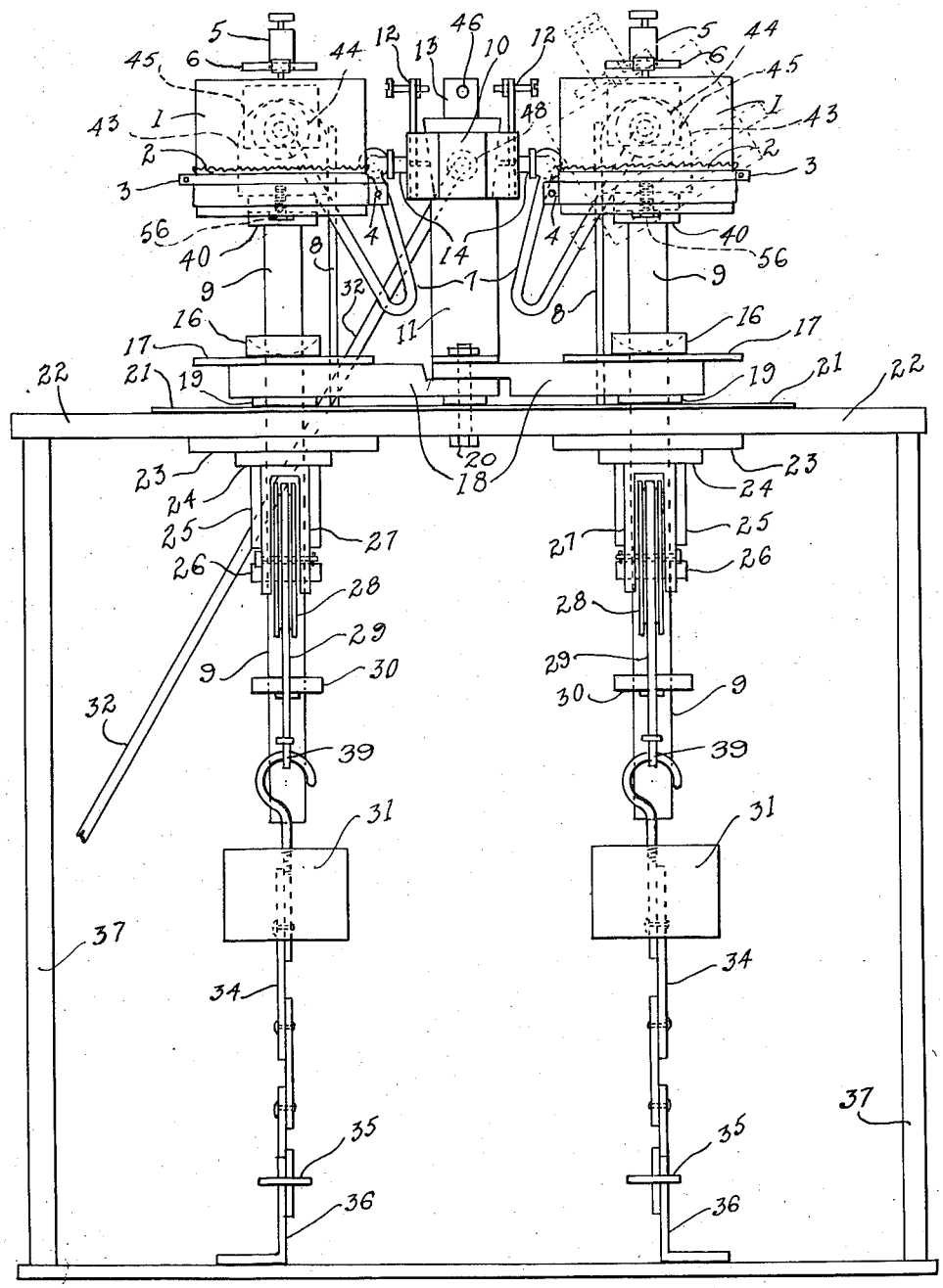

March 2, 1937.  J. H. GRADY ET AL  2,072,329
APPARATUS FOR INCLOSING OBJECTS IN REGENERATED CELLULOSE
Filed March 23, 1934  6 Sheets-Sheet 1

INVENTORS:
John H. Grady, Joseph W. Clarke,
BY Hugh K. Wagner.
ATTORNEY.

March 2, 1937.  J. H. GRADY ET AL  2,072,329
APPARATUS FOR INCLOSING OBJECTS IN REGENERATED CELLULOSE
Filed March 23, 1934  6 Sheets-Sheet 2

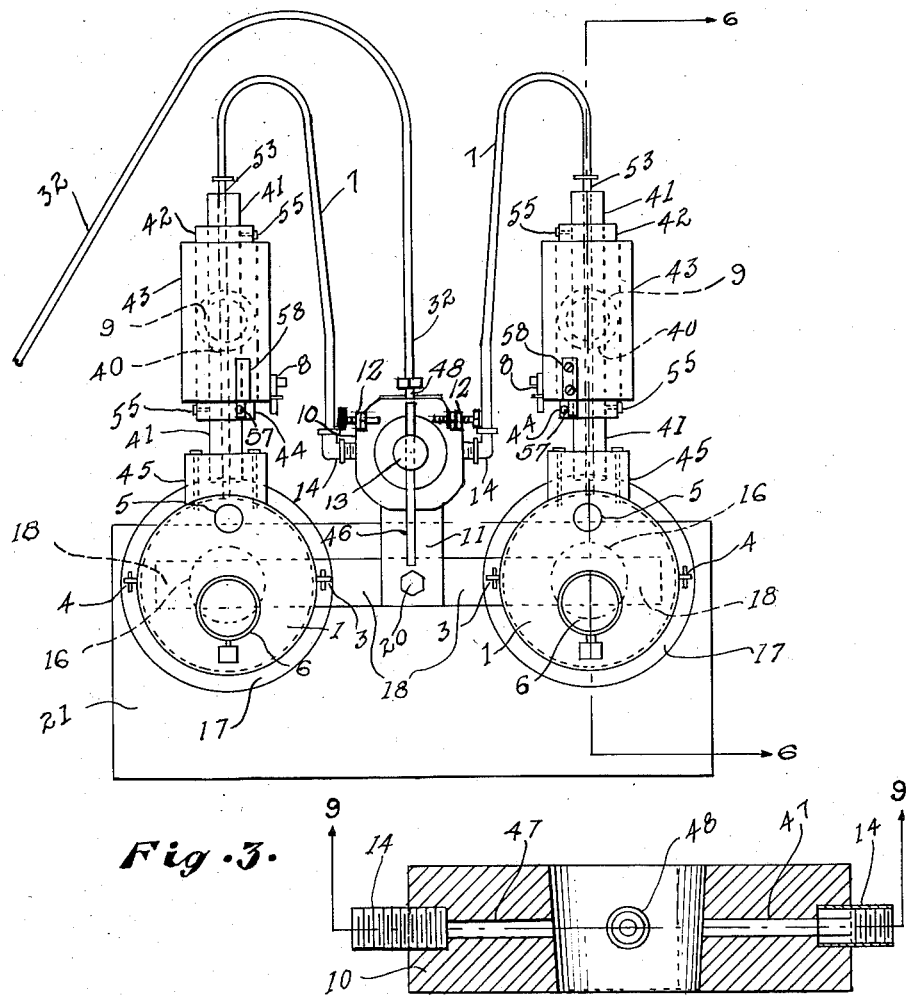

March 2, 1937. J. H. GRADY ET AL 2,072,329
APPARATUS FOR INCLOSING OBJECTS IN REGENERATED CELLULOSE
Filed March 23, 1934 6 Sheets-Sheet 4

INVENTORS:
John H. Grady,
Joseph W. Clarke,
BY Hugh K. Wagner,
ATTORNEY.

March 2, 1937.  J. H. GRADY ET AL  2,072,329
APPARATUS FOR INCLOSING OBJECTS IN REGENERATED CELLULOSE
Filed March 23, 1934   6 Sheets-Sheet 5

INVENTORS:
John H. Grady, Joseph W. Clarke,
BY
Hugh K. Wagner,
ATTORNEY

March 2, 1937. J. H. GRADY ET AL 2,072,329
APPARATUS FOR INCLOSING OBJECTS IN REGENERATED CELLULOSE
Filed March 23, 1934  6 Sheets-Sheet 6
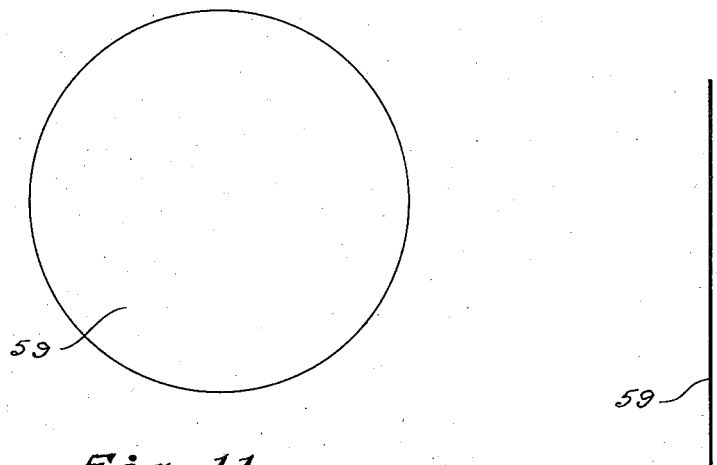
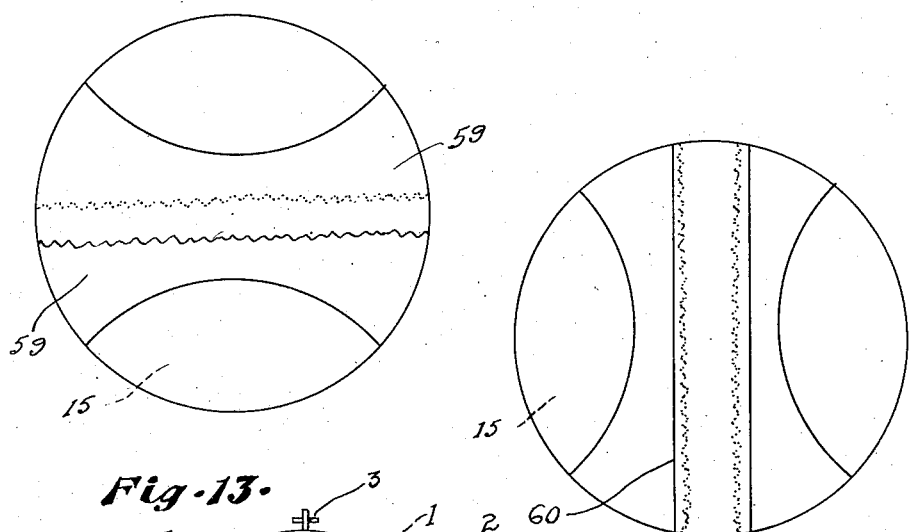
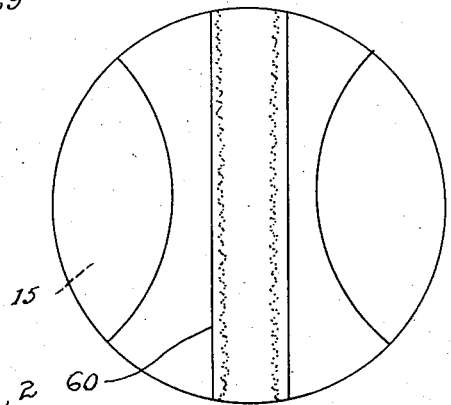
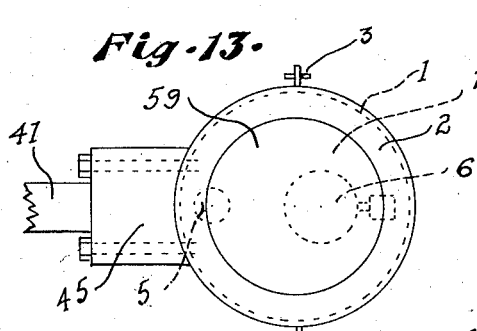
INVENTORS:
John H. Grady, Joseph W. Clarke
BY Hugh H. Wagner
ATTORNEY Patented Mar. 2, 1937

2,072,329

UNITED STATES PATENT OFFICE 2,072,329

APPARATUS FOR INCLOSING OBJECTS IN REGENERATED CELLULOSE

John H. Grady and Joseph W. Clarke, St. Louis, Mo., assignors to J. H. Grady Manufacturing Company, St. Louis, Mo., a corporation of Missouri Application March 23, 1934, Serial No. 717,004

4 Claims. (Cl. 93—2)

This invention consists of apparatus for wrapping or inclosing objects in regenerated cellulose. Among the articles that may be thus inclosed are baseballs, other play balls, fruits, eggs, and rectangular articles, and numerous other things, such, for instance, as a plurality of golf balls thus wrapped as an oblong package or a plurality of match packets wrapped in one package.

It has been found in actual practice that covering articles by hand with regenerated cellulose is slow and tedious and does not result in as neat and good-looking a package as is produced by this invention.

The problem and difficulty in inclosing objects with regenerated cellulose arises partly from their shape, but chiefly from the nature of the material, as regenerated cellulose cannot be shaped and retained in shape unless moist, but it dries so speedily as to be hard to handle, especially so to manipulate it as to form a close-fitting sheath or wrapper, and this is particularly true in regard to a sphere or a spheroid or an ovoid or anything else having a curvilinear surface or contour. After a shape or form has been imparted to the regenerated cellulose in a moist condition by the present invention, it retains it and, in addition, remains a snug-fitting envelope for the article to which it has been applied.

At the meeting-place of the opposite edges of the piece or blank of regenerated cellulose after its application to the ball or the like, a strip of regenerated cellulose may be pasted on by moisture or otherwise, forming a permanent or durable joint, and, if the said strip is of a different color from the envelope, its addition to the ball or the like may be either the distinguishing mark of the manufacturer or dealer or a decoration that makes a dressy package.

Other points of invention will hereinafter appear.

Figure 2:
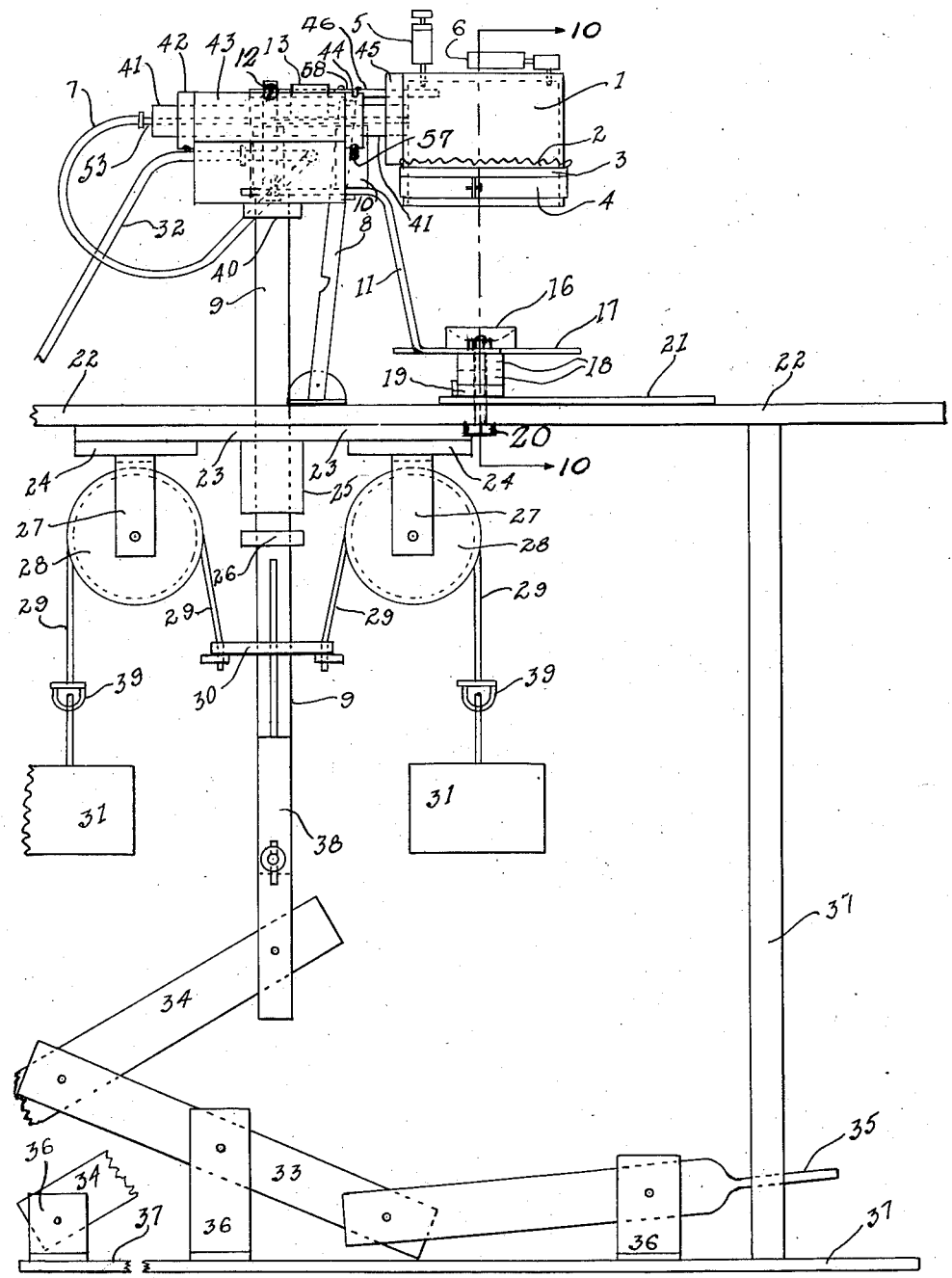
Figure 6:
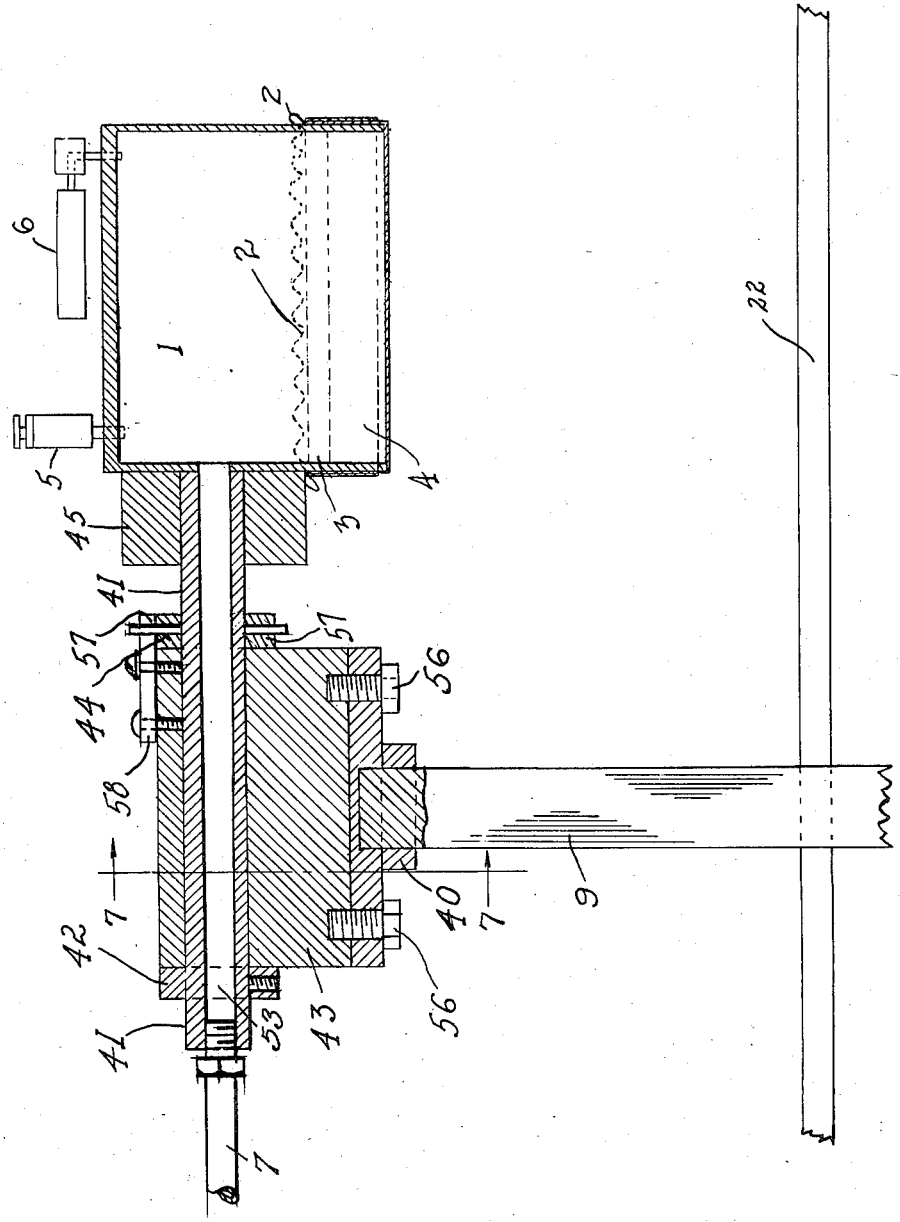

In the drawings, wherein like numbers of reference refer to likeparts wherever they appear, Fig. 1 is a front elevation.
Fig. 2 is a side elevation.
Fig. 3 is a plan view.
Fig. 4 is a sectional view on an enlarged scale of a part of the apparatus that regulates the flow of air into the air-chambers.
Fig. 5 is a sectional view on an enlarged scale of another part that regulates the flow of air into the air-chambers.
Fig. 6 is an enlarged sectional view taken on the line 6—6 in Fig. 3.

Figure 7:
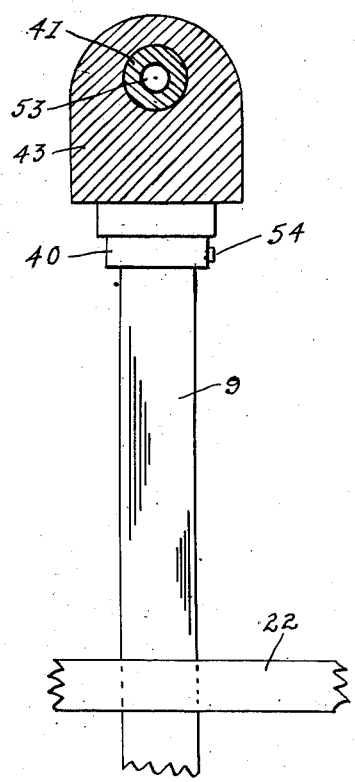
Figure 8:
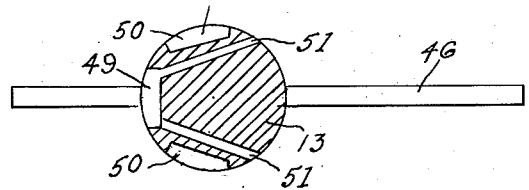
Figure 9:
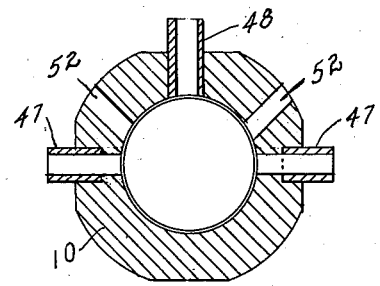
Figure 10:
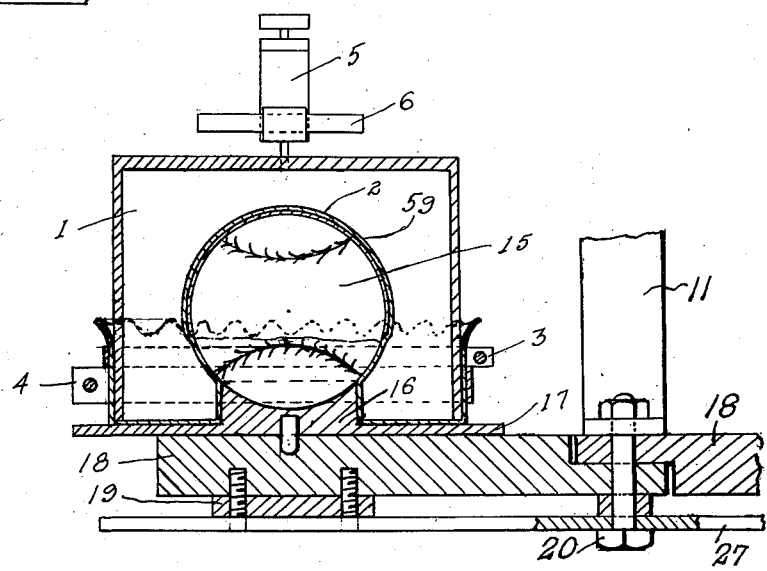

Fig. 7 is a sectional view taken on the line 7—7 in Fig. 6.
Fig. 8 is a sectional view taken on the line 8—8 in Fig. 5.
Fig. 9 is a sectional view taken on the line 9—9 in Fig. 4.
Fig. 10 is a sectional view on an enlarged scale, taken on the line 10—10 in Fig. 2, showing the object to be covered.
Fig. 11 is a plan view of the blank to be used in covering the object.
Fig. 12 is a side elevation thereof.
Fig. 13 is an elevational or plan view of the covered object.
Fig. 14 is a similar view of the object covered and trimmed, and
Fig. 15 is a plan view, showing the diaphragm turned upward to receive a piece of regenerated cellulose for moistening.

Each air-chamber 1 is provided with a cover or diaphragm 2 of rubber or other elastic material, held in place by bands 3 and 4. This may be thin or thick, depending upon the nature or shape of the object to be covered. Preferably, a well-known type of rubber, such as used by dentists in making dental dams and characterized by being, for its thickness, relatively tough, strong, and elastic, is used, because of its characteristics. Safety-valves 5 and air-gauges 6 and rubber tubes 7 control and conduct the air to the air-chambers 1.

Two levers 8 hold the air-chambers while the object is being covered. Rods 9 cause vertical movement of air-chambers 1.

The valve 10 is held in place by a brace 11, and a stop 12 prevents the center part 13 of valve 10 from turning completely around. Fittings 14 connect the valve 10 and tubes 7.

The object to be covered 15 is placed in a partially-hollowed receptacle or cup 16, which is fastened to plate 17, which is securely attached to bars 18, which bars 18 rest on a metal plate 19 while the object 15 is being covered.

Bolt 20 passes through a metal plate 21 and the table 22 on which the upper part of the apparatus rests. Bolt 20 holds brace 11 securely in place and, also, acts as an axis allowing bars 18 to swing forward.

Wooden blocks 23 and 24 are fastened to the under side of table 22 and support the bottom part of the machine.

Sleeves 25 allow rods 9 to slide freely, and collars 26 prevent rods 9 from rising too high.

Brackets 27 support pulleys 28. One end of each cable 29 is fastened to a wooden block 30, which is secured to a rod 9 and passes over the top of a pulley 28, the other end of cable 29 being attached to a weight 31, which thereby holds its rod 9 to the proper height.

One end of rubber tube 32 connects with valve 14, and its other end connects with a tank of compressed air (not shown in the drawings) or any other suitable source of air-pressure.

Levers 33 connect levers 34 with treadles 35, pivoted to supports 36, attached to frame 37, and actuate bars 38 to cause rods 9 to be moved vertically downward when pressure is applied to the said treadles 35. Weights 31, adjustably connected at 39 to the cables 29, cause the return of rods 9 to initial position when the treadles 35 are released. Plates 40 secure the rod 9 to the upper part of the apparatus.

Tube 7 communicates with tube 41, which passes through a collar 42 and part 43 and collar 44, and is fastened securely to part 45, which is fixed to air-chamber 1.

The handle 46 on part 13 is used to turn part 13 to the right or left, thereby causing ports 47 and 48 in part 11 to be in direct alignment with passages 49, 50, and 51 in part 13. Escape port 52 allows the air remaining in the air-chamber 1 after the object 15 has been covered to exist. Thus a three-way cock is provided. The passage 53 through tube 41 leads from the air-chamber 1 to tube 7.

A set-screw 54 holds tube 41 securely in place, and set-screw 55 binds collars 42 and 44 securely to rod 9, so as to prevent part 43 from sliding forward or backward. Bolts 56 secure plate 40 to part 43. The stops 57 strike against stops 58 and prevent tube 41 from making a complete rotation.

In covering or inclosing objects 15 with regenerated cellulose in the use and practice of this invention, a quantity of prepared blanks or the like 59 of regenerated cellulose or the like is located adjacent to the hand of the operator, who first puts an object 15 in the cup 16 and then places a blank 59 on the diaphragm 2 in one of the machines, while the said diaphragm is turned upward, and while in that position moisture is applied to the surface of the regenerated cellulose away from diaphragm 2. The air-chamber 1, carrying diaphragm 2, and moistened regenerated cellulose 59, is then rotated on its axis 41 from the position shown in Figure 15 and as shown in transit in dotted lines in Figure 1 until diaphragm 2 is above the object 15, and presses the moistened regenerated cellulose 59 on the object 15 with its moistened side next to the object 15. Blank 59 is preferably laid concentrically on diaphragm 2. Moisture on regenerated cellulose causes the same to cling to other objects, particularly to other regenerated cellulose. The blanks 59 are of such a size that when spread over the upper part of the object 15 in cup 16 the blank will pass slightly beyond the middle of the object 15. The regenerated cellulose is thin, notwithstanding the reference to it herein as a blank, and, under pressure, when moist readily conforms to the shape of the article 15 on which it is placed and impressed.

The operator next depresses the treadle 35, which by intermediate parts draws rod 9 downward, carrying with it air-chamber 1, so as to cause diaphragm 2 to contact with the object 15 and thereby pressing the same against the object 15 with the blank 59 of moistened regenerated cellulose between them, whereby the regenerated cellulose is forced into close contact with the upper part of the surface of the object 15 and is thereby caused to take its shape and to adhere thereto. The object 15 is, of course, convex or otherwise protuberant, and the shape of the pressed regenerated celluose is concave or otherwise cup-like.

Compressed air is admitted into the air-chamber 1 by moving handle 46 when the object 15 is thus pressed against diaphragm 2, and the air-pressure causes diaphragm 2 to fit snugly against the object 15, thus forcing out any air bubbles or the like between the regenerated cellulose and the object 15. The regenerated cellulose being moist adheres and clings to the object 15 and likewise assumes its shape. Quickly drying, it retains that shape, as well as remaining in adherence to the object 15. As shown in Figure 13, the blank 59 is preferably of such a size as to cover a little more than one-half of the surface of object 15, this being from the top, as shown in Figure 10, when the object 15 is in cup 16. After the blank 59 has thus been applied to the object 15, handle 46 is turned in the opposite direction, and by means of the three-way cock the compressed air exhausts from air-chamber 1.

When the object 15 has been thus half covered, the treadle 35 is released, the weight 31 returns air-chamber 1 to its initial position, which removes diaphragm 2 from contact with object 15, and this allows removal of it from cup 16. The shape of the cup 16 may be varied to suit the contour of the object to be covered.

The object 15 is then turned over (placed upside down) and put in cup 16 in the adjoining mechanism, where a blank 59 of moistened regenerated cellulose is similarly applied to the other half of object 15, by the same kind of operations of the second diaphragm 2, the second air-chamber 1, the second treadle 35, its rod 9, air-pressure, etc. The said second blank 59 of regenerated cellulose preferably slightly overlaps the one first applied. The article emerges in the form shown in Figure 13. The said operations on the adjoining mechanism can be performed on the first, but for larger production are preferably performed on a second machine.

The joint between the two pieces of regenerated cellulose 59 thus applied is preferably bound or covered by a strip 60 of regenerated cellulose, which is preferably of a different color for its decorative and distinguishing effect. If desired, the two disks may be of different colors from each other. The finished product, with the strip 60 attached, is shown in Figure 14. The strip 60 of regenerated cellulose is first moistened and then pressed in any desired manner upon the regenerated cellulose already in place inclosing or covering the object 15.

The pair of machines herein shown and described may be increased to any multiple of either, with the object of augmenting production. The foot-treadles may be substituted by power or other means of actuation, and the particular construction of the means for forcing the object to be covered into contact with the elastic diaphragm may be altered, and many minor changes may be made in the construction, form, order, and arrangement of parts without departing from the spirit of this invention or the scope of the following claims.

The blank 59 as shown in the drawings is of a shape that enables it to fit over a curvilinear object, but will be adapted to different shapes. In the case of a sphere, such, for instance, as a baseball, it will be circular, as shown in Figures 11 and 12. An oblong package, as, for instance, of a plurality of golf balls, match packets, or other articles, will require a different shape of blank 59. In the case where a plurality of articles is to be inclosed in regenerated cellulose or the like, it is to be understood that such group constitutes the object 15.

When the air-chamber 1 is advanced, as hereinabove described, it preferably travels to contact or near contact with the table above which the work-holder or cup 16 projects, which results in the object 15 being forced into close contact with the diaphragm 2 so much so that it bulges upward, while also being in close contact with the sides as well as the top of the object to be covered.

Steam or other fluid pressure may be substituted for air-pressure.

Having thus described this invention, what we claim and desire to secure by Letters-Patent is:

1. An apparatus of the character described, comprising a work-holder, a cylinder closed at one end and having an elastic diaphragm and forming an air-chamber, said cylinder being movable in a vertical arc whereby the said diaphragm in one position forms a supporting table for regenerated cellulose to be moistened, means for admitting air under pressure into the said air-chamber, and means for advancing the said air-chamber to a point where the object to be covered forces the said elastic diaphragm out of its normal line and against the said air-pressure, and means for returning the said air-chamber to its initial position.

2. In an apparatus for applying a covering blank to an article, an article support, means to provide an air chamber movable in a vertical arc and including an elastic diaphragm to receive a covering blank, means for admitting air to and exhausting the air from said air chamber, and vertically movable means for supporting said means to provide an air chamber.

3. In an apparatus for applying a covering blank to an article, an article support, a hollow member providing an air chamber, an elastic diaphragm forming one face of said air chamber and movable to a position to support a covering blank to be moistened, a shaft for supporting said hollow member, a bearing having said shaft journaled therein, a vertically slidable rod supporting said bearing, means for normally urging said rod toward the upper limit of its path of movement, and mechanical means for moving said rod away from said upper limit of its path of movement.

4. In an apparatus for applying a covering blank to an article, an article support movable in a horizontal arc, an air chamber movable in a vertical arc and including an elastic diaphragm to receive a covering blank, means for admitting air to and exhausting the air from said air chamber, and means for causing relative to and fro movement between said air chamber and support.

JOHN H. GRADY.
JOSEPH W. CLARKE.